A. J. MILLER.
HAY AND CATTLE RACK.
APPLICATION FILED AUG. 28, 1907.
899,315.
Patented Sept. 22, 1908.
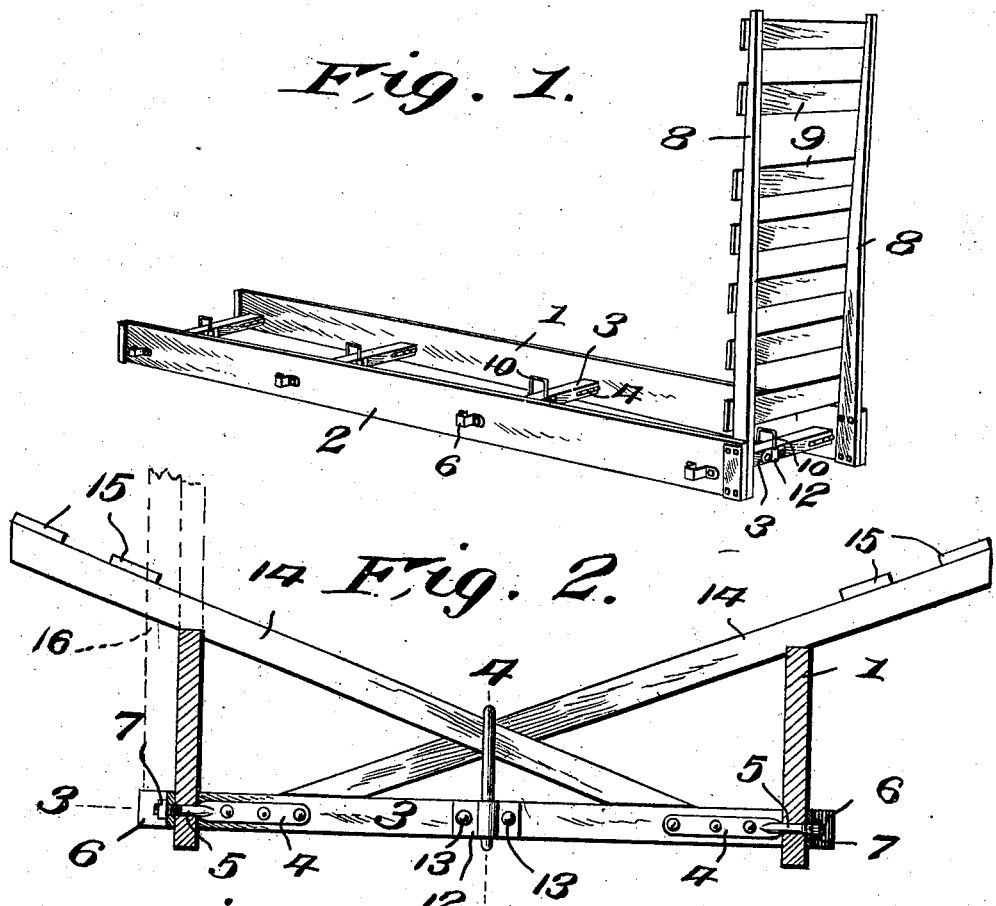
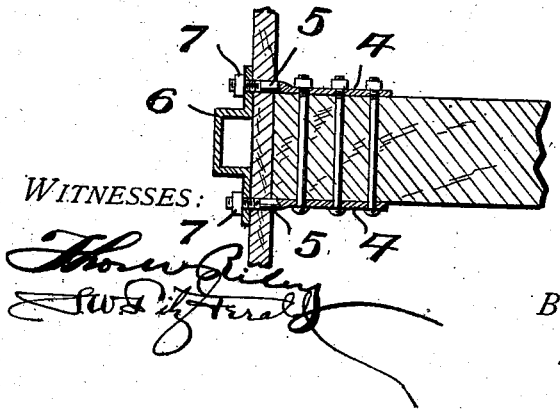
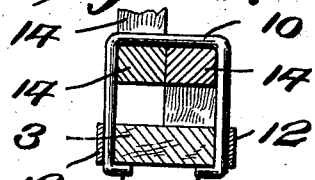
INVENTOR
A. J. Miller

UNITED STATES PATENT OFFICE.

ADOLPH JOHN MILLER, OF MANAWA, WISCONSIN.

HAY AND CATTLE RACK.

No. 899,315.　　　　Specification of Letters Patent.　　　Patented Sept. 22, 1908.

Application filed August 28, 1907. Serial No. 390,534.

*To all whom it may concern:*

Be it known that I, ADOLPH JOHN MILLER, a citizen of the United States, residing at Manawa, in the county of Waupaca and State of Wisconsin, have invented certain new and useful Improvements in Hay and Cattle Racks; and I do hereby declare the following to be a full, clear, and exact description of the invention, such as will enable others skilled in the art to which it appertains to make and use the same.

My invention relates to a combination wagon bed, which, for convenience, I designate as a combined hay and cattle rack, and it consists of certain novel features of combination and construction, the preferred form of which will be hereinafter clearly set forth and pointed out in the claims.

The object of my invention, among others, is to provide a convenient variety of wagon bed, which may be readily adapted for hauling hay or live stock, as well as hauling grain in bulk and other similar substances, thereby affording a very convenient adjunct to the farmer's appliances.

In the accompanying drawings which are made a part of this application, Figure 1 is a perspective view of my wagon rack, partially completed as a hay rack. Fig. 2 is a transverse section of the base or body portion of my wagon rack. Fig. 3 is a sectional detail view showing the preferred means of connecting the frame sections with the cross bars which hold them together, and, Fig. 4 is a detail view of the adjustable clamp or seat, designed for engaging the inner ends of the hay rack supporting members.

In order to conveniently refer to the various details of my invention and coöperating parts, numerals will be employed, it being understood that the same numeral refers to a corresponding part in the several views.

Referring to the numerals on the drawings, 1 and 2 indicate the main or side members of my wagon rack or frame, which may be made of any suitable material and of any desired size and are connected together at proper intervals by the connecting bars 3 of a proper length to fit between the members 1 and 2 and provided at each end and upon each side with the anchoring irons 4, there being two of said irons for each end of the bars 3, as will be observed by reference to the drawings. Each of the anchoring irons 4 is provided with a threaded terminal 5, designed to pass through suitable apertures in said frame sections 1 and 2 and also pass through the apertures in the standard sockets 6, said parts being reliably secured together by the suitable locking nuts 7. I also provide suitable end sections consisting of standards 8 and a plurality of cross bars 9, said standards being reliably bolted or otherwise secured to the ends of the frame members 1 and 2, as shown in Fig. 1. I also provide for the middle section of each of the members 3 the vertically movable clamp 10, a detail of which is shown in Fig. 4. The movable or adjustable clamp 10 consists of a properly bent rod or bar having the inwardly directed ends 11 and said member is of sufficient size to fit over the connecting bars 3 and is held in position by the clips or brackets 12, the latter being held by bolts or screws, as indicated by the numeral 13.

The office performed by the members 10 is to receive the inner ends of the arms 14, which latter support upon their outer ends, a plurality of hay supporting members or boards 15, properly connected to said arms 14 in any desired way, whereby all of said arms and boards may be readily withdrawn from their engagement with the adjustable clamping members 10.

It will be understood that the members 10 may be forced downward when not elevated to receive the inner ends of the arms 14, thereby permitting a floor (not shown) to be laid upon the connecting bars 3, as will be clearly understood.

By providing the socket members 6, suitable vertically disposed standards 16 are provided, whereby side boards for the wagon bed may be readily secured in place, thereby fitting the rack for hauling live stock, grain or the like. My combined rack, therefore, will be found at all times to be easily convertible into a rack for hauling hay or for carrying live stock, grain and the like, thus necessitating but very little labor to convert it from one form of rack into another and believing that the advantages and construction of my improved combined stock and hay rack have thus been made clearly apparent, further description is deemed unnecessary.

What I claim is:

In a device of the character described, the combination of side bars, connecting bars interposed therebetween, anchoring irons secured to the sides of the connecting bars at each end and projecting beyond said end, the projecting portions of the irons being screw threaded and passing through the side bars, sockets on the exterior surfaces of the side bars, the threaded portions of said irons passing through said sockets, means engaging the threaded portions of the irons for clamping the sockets to the side bars and a vertically adjustable clamp arranged centrally of each connecting bar.

In testimony whereof I have signed my name to this specification in the presence of two subscribing witnesses.

ADOLPH JOHN MILLER.

Witnesses:
J. C. QUIMBY,
M. H. QUIMBY.